US008509757B2

(12) United States Patent
Schlueter

(10) Patent No.: US 8,509,757 B2
(45) Date of Patent: Aug. 13, 2013

(54) CELL PHONE WITH AUTOMATIC DIALING LOCKOUT

(76) Inventor: John Schlueter, Milwaukee, WI (US)

(*) Notice: Subject to any disclaimer, the term of this patent is extended or adjusted under 35 U.S.C. 154(b) by 0 days.

(21) Appl. No.: 13/110,448

(22) Filed: May 18, 2011

(65) Prior Publication Data

US 2011/0287754 A1 Nov. 24, 2011

Related U.S. Application Data

(60) Provisional application No. 61/345,709, filed on May 18, 2010.

(51) Int. Cl.
*H04M 3/00* (2006.01)

(52) U.S. Cl.
USPC .......................................................... 455/418

(58) Field of Classification Search
None
See application file for complete search history.

(56) References Cited

U.S. PATENT DOCUMENTS

| 6,216,017 | B1* | 4/2001 | Lee et al. ....................... 455/567 |
| 7,345,696 | B2* | 3/2008 | Nakae et al. ............... 348/14.02 |
| 2005/0066091 | A1 | 3/2005 | Tsai |
| 2006/0227957 | A1* | 10/2006 | Dolan et al. ............. 379/212.01 |
| 2007/0132849 | A1* | 6/2007 | Hill et al. ....................... 348/159 |
| 2007/0156364 | A1 | 7/2007 | Rothkopf |
| 2008/0165203 | A1* | 7/2008 | Pantfoerder .................. 345/589 |
| 2009/0085922 | A1* | 4/2009 | Harris et al. .................. 345/556 |
| 2009/0262078 | A1 | 10/2009 | Pizzi |
| 2010/0265182 | A1* | 10/2010 | Ball et al. ....................... 345/168 |
| 2010/0273443 | A1* | 10/2010 | Forutanpour et al. ....... 455/404.1 |
| 2011/0179355 | A1* | 7/2011 | Karlsson ....................... 715/702 |

* cited by examiner

*Primary Examiner* — Patrick Edouard
*Assistant Examiner* — Shantell L Heiber
(74) *Attorney, Agent, or Firm* — Boyle Fredrickson S.C.

(57) ABSTRACT

A cell phone prevents inadvertent dialing or answering of the cell phone by detecting a low light condition consistent with the phone being in a pocket, purse or the like. The ability to use the phone unencumbered in low light situations is provided by using the low-light detection not to disable the phone but to cause a user prompt that requests a user decision on rejecting the phone activity. The user input is tailored to a particular predetermined button for either condition to ensure the results of this prompt are unlikely to be satisfied by an accidental keypress.

14 Claims, 3 Drawing Sheets

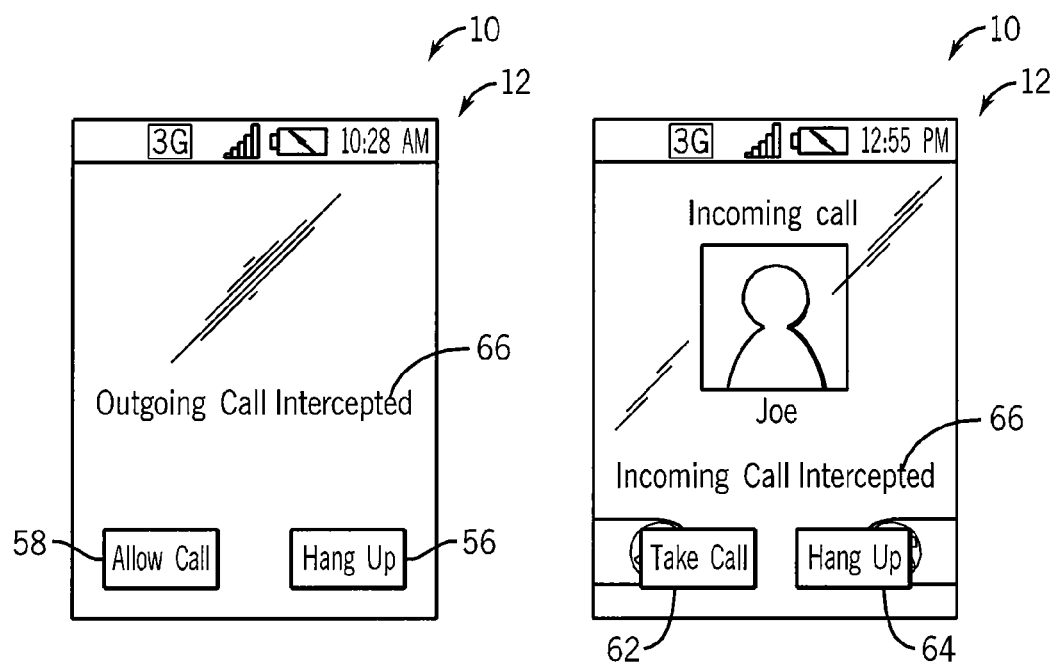

CELL PHONE WITH AUTOMATIC DIALING LOCKOUT

CROSS REFERENCE TO RELATED APPLICATION

This application claims the benefit of U.S. provisional application 61/345,709 filed May 18, 2010 and hereby incorporated by reference.

STATEMENT REGARDING FEDERALLY SPONSORED RESEARCH OR DEVELOPMENT

BACKGROUND OF THE INVENTION

The present invention relates generally to portable communication devices and, more particularly, to cell phones and a method of preventing accidental dialing of cell phones.

DESCRIPTION OF RELATED ART

Portable communication devices, such as mobile phones, personal digital assistants, mobile terminals, etc., typically include a keypad that allows data entry by the user including, for example, the dialing of a telephone number to initiate a call. Frequently, such devices provide for shortcut key sequences that permit rapid dialing of pre-stored phone numbers. This latter feature, in particular, raises the possibility of inadvertently dialing valid phone numbers by an accidental pressing of the keys, for example, if the phone is not suitably deactivated before being placed in a pocket or purse or the like. Such unintended dialing of the cell phone may lead to excessive battery wear and potential embarrassment for the user. A similar problem can occur with incoming calls that are inadvertently answered without knowledge of the user.

Typically such phones have keyboard lock sequences or devices; however, the users may forget to use the sequences.

For this reason, it is known in the art to monitor the ambient light received by the phone to deduce the whether the phone may be in a pocket or purse or the like as taught by US patent application 2005/0066091 to Tsai. A low ambient light level detected by the phone indicates that the phone is in the user's pocket or purse causing any key strikes to be disregarded.

SUMMARY OF THE INVENTION

The present inventors have determined that phone "lockout" systems that monitor ambient light can undesirably prevent the use of the phone in possibly critical situations when the phone is being used outside of the purse or pocket, yet in an environment that has low illumination, for example at night. The present invention addresses this defect through a supplemental prompting of the user for an authorization for the phone activity. Overriding the lockout during a predefined window of time allows the phone to be used in its normal manner. By limiting the keystrokes required for the override and the window of time, a trade-off between unintended calls and unintended lockout may be flexibly affected.

Specifically, in one embodiment, the present invention provides a computer program stored in a non-transient computer medium. The computer program may be executed by a cell phone having a display screen, user input keys, and a light sensor, to detect phone activity on the cell phone indicating at least one of the beginning of an incoming call or outgoing call and, in response to this detection, check ambient brightness in the environment of the cell phone using the light sensor. When the ambient brightness is below a predetermined threshold, the user is prompted with a display on the display screen to process the call or hang up. In response to this prompt, when a key press on the input keys indicates an intent to terminate the phone activity within a predetermined time window, the phone activity is terminated. Alternatively, when a key press on the input keys indicating an intent to process the phone activity is received within the predetermined time window, the phone activity is allowed to complete. Finally, when no keypress is received within the predetermined time window the phone activity is blocked.

It is thus a feature of at least one embodiment of the invention to provide a simple method of preventing unintended phone calls that can be used with most cell phones having light sensors such as cameras but that ensures operability of the phone in low light, possibly critical, situations.

The keypress on the input keys indicating an intent to process the phone activity may be a key sequence starting with a key press of only one predetermined key.

It is thus a feature of at least one embodiment of the invention to permit overriding of the light sensing feature through a keystroke command, without undoing the very purpose of the invention to prevent inadvertent keystrokes from activating a phone. By limiting the time window and the particular key which must be struck the likelihood of inadvertent phone answering is acceptably reduced.

The display screen may present instructions as to the key sequence necessary to indicate an intent to process the phone activity and an intent to terminate the phone activity.

It is thus a feature of at least one embodiment of the invention to provide a system that may be used without previous instruction of the user.

The user input keys may be virtual keys on a display screen having an overlay touchscreen and the program may present the instructions on the display screen as to the key sequence necessary to indicate an intent to process the phone activity by means of text printed on virtual keys.

It is thus a feature of at least one embodiment of the invention to provide user instructions that may be readily assimilated and viewed in a low light situation.

The display screen may further indicate whether the phone activity is an outgoing call or an incoming call.

It is thus a feature of at least one embodiment of the invention to distinguish between incoming calls and accidental outgoing calls which the user may wish to treat differently.

The cell phone may include a camera and the checking of ambient brightness may take an average of pixels of the camera.

It is thus a feature of at least one embodiment of the invention to provide a simple method of detecting likelihood that the phone is in a pocket or purse to use of the camera.

The computer program may include user input keys that are virtual keys on a display screen having an overlay touchscreen.

It is thus a feature of at least one embodiment of the invention to prevent inadvertent dialing or phone answering which may occur on phones with virtual buttons.

These particular objects and advantages may apply to only some embodiments falling within the claims and thus do not define the scope of the invention.

BRIEF DESCRIPTION OF THE DRAWINGS

FIG. 4 is a screen display of a phone showing using the program of the present invention presenting virtual buttons for checking the intent of the user during the outgoing phone operation; and FIG. 5 is a figure similar to that of FIG. 4 showing the buttons for checking the intent of the user during an incoming phone operation.

DETAILED DESCRIPTION OF THE PREFERRED EMBODIMENT

Figure 1:
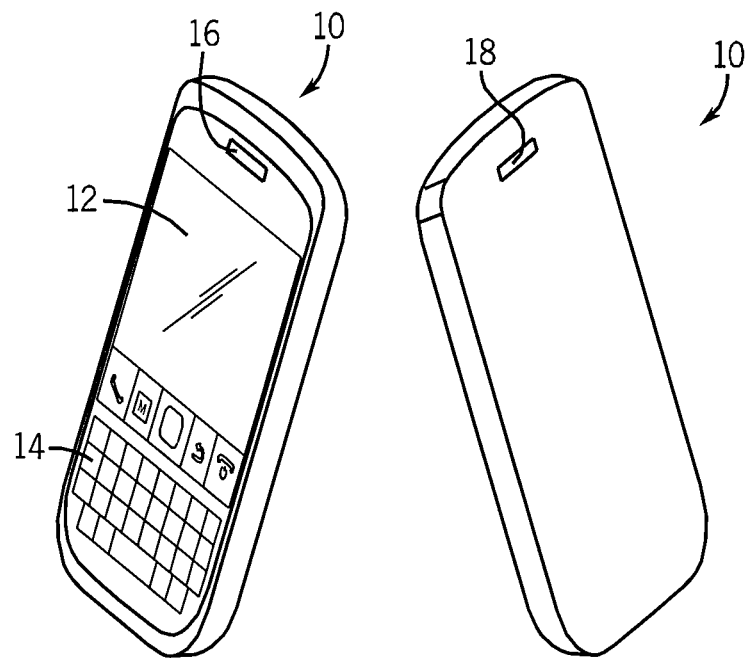
FIG. 1 is a perspective view of a front and rear surface of a conventional cell phone showing the keypad that may be accidentally activated and two typical camera locations on the front and back of the cell phone.

Referring now to FIG. 1, a cell phone 10 may provide for display 12 such as an LCD associated with a keypad 14. The keypad 14 may have mechanical or membrane type switches that are pressed to enter alphanumeric data into the cell phone, for example, for the purpose of initiating a call, or may have virtual buttons formed by a touchscreen overlying the display 12 and having targets presented on the display 12. The cell phone 10 may include a camera 16 placed on the front of the cell phone facing the user when operating the keypad 14, or a camera 18 placed on the back side of the cell phone 10.

Figure 2:
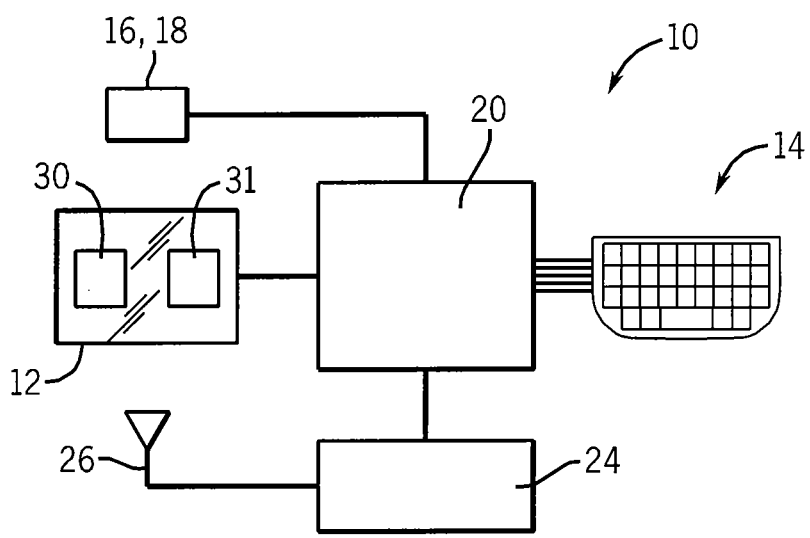
FIG. 2 is a block diagram of a typical cell phone system showing a camera communicating with a processor having keyboard entry and associated with a radiofrequency subsystem.

Referring now to FIG. 2, the cell phone 10 may incorporate a processor 20 that may execute a stored program to receive data from the keypad 14 and provide data to the display 12 in conjunction with the initiation of telephone calls by providing data to and receiving data from an RF subsystem 24 communicating with an internal antenna of the type well known in the art. The processor 20 may also receive image data from the cameras 16 or 18 comprised of multiple pixels each having a brightness value and a spatial location.

Figure 3:
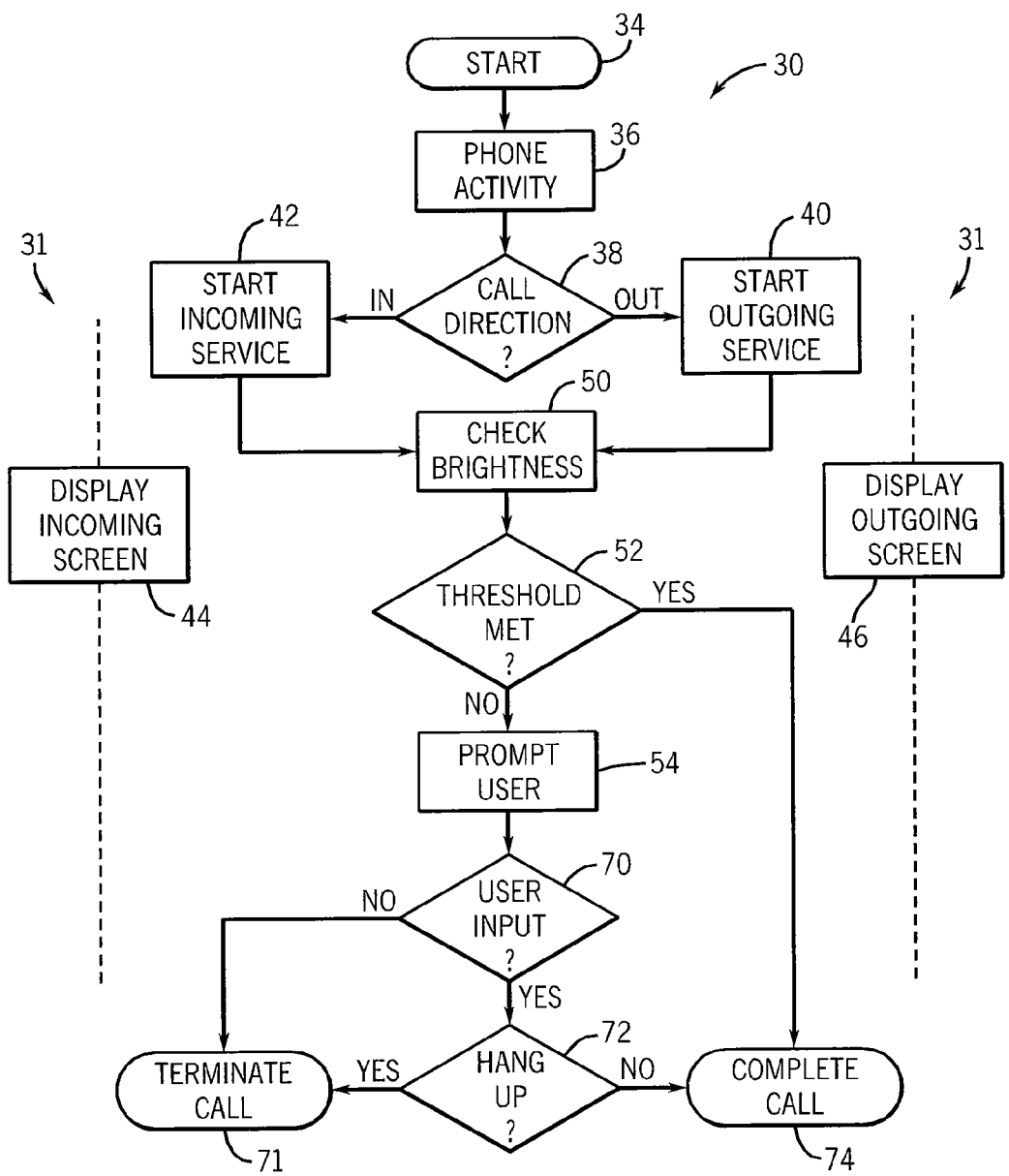
FIG. 3 is a flow chart of a program that may be executed by the processor of FIG. 2 to implement the present invention.

Referring now to FIG. 3, the processor 20 may execute a stored program 30, for example an application program downloadable to the cell phone 10, that may start at process block 34 as activated by the user or according to a boot up routine. Process block 36 of the program 30 detects phone activity in the form of a beginning of an outgoing call or a receiving of an incoming call such as may be detected by monitoring states presented by the phone's operating system 31 (shown in FIG. 2). The beginning of an outgoing call, for example, may be indicated by pressing of keys for dialing a phone number while the beginning of an incoming call may be detected by a signal from the RF subsystem 24 as is understood in the art.

At process block 38, a call direction (in/out) may be detected to start an outgoing service 40 or an incoming service 42 in the cell phone operating system 31. These services, executed by the normal operating system 31 of the cell phone may activate an incoming display screen indicated by process block 44 or corresponding outgoing display screen indicated by process block 46.

At process block 50, a brightness of the ambient environment of the cell phone may be determined by interrogation of the cell phone camera 16 or 18. This interrogation may read an image from the cell phone camera and averaged brightness values of the pixels to deduce a brightness value for the ambient environment of the cell phone. At process block 52, this brightness value is compared to a brightness threshold selected so that a brightness below the threshold is a low light condition likely to be experienced when the phone is in a pocket or purse and a brightness above the threshold is likely to occur when the phone is in the user's hand or on a table or the like.

Such low light conditions can also occur when the phone 10 is out of the pocket or purse in active use but in a dark environment, for example at night. For this reason, when the threshold section of process block 52 indicates a low light environment, at subsequent process block 54, the user is prompted determine whether they wish the phone activity detected at process block 36 to be completed.

Referring momentarily to FIG. 4, the prompt provided at process block 54 may consist of different displays depending on the detection of an incoming or outgoing phone call at process block 36. For an outgoing phone call, possibly accidentally dialed, the display 12 provides two virtual buttons 56 and 58, with virtual button 56 captioned "Hang up" and virtual button 58 captioned "Allow Call". The user is thus directly informed as to the necessary button pressing to achieve the desired intent. The display 12 may also indicate that an outgoing call has been intercepted per text caption 60 so that the user can tell that the buttons 56 and 58 refer to an accidental dialing of a number by the user on the cell phone 10.

Conversely, for an incoming call that otherwise might be accidentally accepted, display 12 may display virtual buttons 62 and 64, the former with the phrase "Take Call" and the latter the phrase "Hang up", these captions instructing the user of the necessary actions that must be taken in this context. Addition text label 66 may be displayed indicating that this is an incoming call which the user may wish to treat differently than the outgoing call.

Referring again to FIG. 3, at process block 70, if there is no user input within a predetermined time period after the display of the prompt at process block 54 (for example, thirty seconds), the call is terminated as indicated by process block 71 whether it be an incoming call or an outgoing call. Alternatively if there is user input at process block 72 and that input is to hang up, per buttons 56 or 64, the program 30 again proceeds to terminate the phone activity per process block 71.

In the event that the ambient light detected at process block 52 is above the threshold value, the program 30 may proceed to process block 74 at which the phone activity detected at process block 36 is completed (either an incoming call taken or outgoing call dialed). If at process block 72, after the user prompt of process block 54, the user indicates that hanging up is not desired (by pressing buttons 58 or 62 shown in FIGS. 4 and 5) the program also proceeds to block 74 for the call to be completed.

In alternate embodiments of the invention, the determination of whether the phone is in a purse or pocket may evaluate additional image features including (1) an averaging of each pixel value of the image to determine the average light level where low light levels are consistent with being in a pocket; (2) evaluation of the variation in illumination of the pixels of the image or image entry that may be consistent with a low light unfeatured surface such as the interior of a pocket; (3) a low focus image determined by the lack of image sharpness; (4) a regular periodic pattern consistent with fabric; and (4) particular colors or color ranges inconsistent with being in a pocket or pocketbook. Each of these determinations may be used individually or in combination and may be combined with other data such as phone orientation determined from internal accelerometers or the like. These determinations may further be weighted according to empirically derived weighting factors. For this purpose, the display illumination 12 may be changed by either dimming it or flashing it to provide for additional image clues from the immediate environment for example by reflected light. As used herein, the term keypress refers either to the pressing of a mechanical key or the touching or sliding of a virtual key on the cell phone.

Certain terminology is used herein for purposes of reference only, and thus is not intended to be limiting. For example, terms such as "upper," "lower," "above", and "below" refer to directions in the drawings to which reference is made. Terms such as "front," "back," "rear," "bottom" and "side," describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What I claim is:

1. A computer program stored in a non-transient computer medium executable by a cell phone having a display screen, user input keys, and a light sensor, the cell phone providing a standard incoming display screen for an incoming call and a standard outgoing display screen for an outgoing call to:
   (a) detect phone activity on the cell phone indicating a beginning of an incoming call or outgoing call;
   (b) for both detected incoming and outgoing calls, check ambient brightness in the environment of the cell phone using the light sensor;
   (c) for both detected incoming and outgoing calls, only when the ambient brightness is below a predetermined threshold, indicating possible accidental dialing, prompt the user with a supplemental display different from the standard incoming and outgoing screen on the display screen to process the call or hang up, the supplemental display being independent from the standard incoming display screen and standard outgoing display screen and accepting user inputs for hanging up or accepting a call;
   (d) after step (c) when a first supplemental key press on the input keys indicating an intent to terminate the phone activity is received within a predetermined time window in response to the supplemental display, terminate the phone activity;
   (e) after step (c) when a second supplemental key press on the input keys indicating an intent to process the phone activity is received within the predetermined time window, allow the phone activity to complete; and
   (f) when neither the first nor second supplemental key press is received within the predetermined time window, terminate the phone activity.

2. The computer program of claim 1 wherein the key press on the input keys indicating an intent to process the phone activity is a key sequence starting with a key press of only one predetermined key.

3. The computer program of claim 2 wherein the display screen presents instructions as to the key sequence necessary to indicate an intent to process the phone activity and an intent to terminate the phone activity.

4. The computer program of claim 3 wherein the user input keys are virtual keys on a display screen having an overlay touchscreen and wherein the computer program presents the instructions on the display screen as to the key sequence necessary to indicate an intent to process the phone activity by means of text printed on virtual keys.

5. The computer program of claim 4 wherein the display screen further indicates whether the phone activity is an outgoing call or an incoming call.

6. The computer program of claim 1 wherein the cell phone includes a camera and the checking of ambient brightness takes an average of pixels of the camera.

7. The computer program of claim 1 wherein the user input keys are virtual keys on a display screen having an overlay touchscreen.

8. A cell phone executing a computer program including a display screen, user input keys, and a light sensor the cell phone providing a standard incoming display screen for an incoming call and a standard outgoing display screen for an outgoing call, and executing a stored program on an internal processor to:
   (a) detect phone activity on the cell phone indicating a beginning of an incoming call or outgoing call;
   (b) for both detected incoming and outgoing calls, check ambient brightness in the environment of the cell phone using the light sensor;
   (c) for both detected incoming and outgoing calls, only when the ambient brightness is below a predetermined threshold, prompt the user with a supplemental display different from the standard incoming and outgoing screen on the display screen to process the call or hang up, the supplemental display being independent from the standard incoming display screen and standard outgoing display screen and accepting user inputs for hanging up or accepting a call;
   (d) after step (c) when a first supplemental key press on the input keys indicating an intent to terminate the phone activity is received within a predetermined time window in response to the supplemental display, terminate the phone activity;

(e) after step (c) when a second supplemental key press on the input keys indicating an intent to process the phone activity is received within the predetermined time window, allow the phone activity to complete; and (f) when neither the first nor second supplemental key press is received within the predetermined time window, terminate the phone activity.

9. The cell phone of claim 8 wherein the key press on the input keys indicating an intent to process the phone activity is a key sequence starting with a key press of only one predetermined key.

10. The cell phone of claim 9 wherein the display screen presents instructions as to the key sequence necessary to indicate an intent to process the phone activity and an intent to terminate the phone activity.

11. The cell phone of claim 10 wherein the user input keys are virtual keys on a display screen having an overlay touchscreen and wherein the computer program presents the instructions on the display screen as to the key sequence necessary to indicate an intent to process the phone activity by means of text printed on virtual keys.

12. The cell phone of claim 11 wherein the display screen further indicates whether the phone activity is an outgoing call or an incoming call.

13. The cell phone of claim 8 wherein the cell phone includes a camera and the checking of ambient brightness takes an average of pixels of the camera.

14. The cell phone of claim 8 wherein the user input keys are virtual keys on a display screen having an overlay touchscreen.

* * * * *